United States Patent [19]

Miki et al.

[11] Patent Number: 4,662,249
[45] Date of Patent: May 5, 1987

[54] SHIFT VALVE WITH AN INTERMEDIATE POSITION DURING A 4-2 SHIFT

[75] Inventors: Nobuaki Miki, Kariya; Shinya Nakamura, Toyota; Kazuhiko Shibata, Anjo, all of Japan

[73] Assignee: Aisin Warner Kabushiki Kaisha, Anjo, Japan

[21] Appl. No.: 795,715

[22] Filed: Nov. 7, 1985

Related U.S. Application Data

[63] Continuation of Ser. No. 354,928, Mar. 5, 1982, abandoned.

[30] Foreign Application Priority Data

Mar. 6, 1981 [JP] Japan .................................. 56-32765

[51] Int. Cl.⁴ ............................................. B60K 41/06
[52] U.S. Cl. ..................................... 74/869; 74/752 A
[58] Field of Search ................. 74/869, 868, 867, 866, 74/752 A

[56] References Cited

U.S. PATENT DOCUMENTS

| | | | |
|---|---|---|---|
| 3,014,383 | 12/1961 | Flinn | 74/869 X |
| 3,776,048 | 12/1973 | Enomoto et al. | 74/866 |
| 3,800,629 | 4/1974 | Lentz | 74/869 |
| 3,823,621 | 7/1974 | Kabo et al. | 74/752 A |
| 3,938,409 | 2/1976 | Uozumi | 74/869 X |
| 3,952,614 | 4/1976 | Iijma | 74/868 X |
| 4,023,444 | 5/1977 | Murakami | 74/868 |
| 4,050,332 | 9/1977 | Taga | 74/869 |
| 4,258,591 | 3/1981 | Eckert et al. | 74/867 X |
| 4,308,764 | 1/1982 | Kawamoto et al. | 74/752 A |
| 4,406,181 | 9/1983 | Kubo et al. | 74/869 |

FOREIGN PATENT DOCUMENTS 2033985  5/1980  United Kingdom ................. 74/869

Primary Examiner—Leslie Braun
Assistant Examiner—Dwight G. Diehl
Attorney, Agent, or Firm—Cooper, Dunham, Griffin & Moran

[57] ABSTRACT

A hydraulic control system for an automatic transmission of a motor vehicle, which is provided with a bleed valve in a fluid chamber of a particular shift valve for restricting pressure increase when line pressure is admitted thereinto for a jumping shift to a lower gear position by bleeding part of the admitted line pressure to limit the displacement of a spool of the shift valve and to hold same in an intermediate position until solenoid pressure turns from high to low level, causing the shift valve to retain temporarily an intermediate gear position to lessen the deceleration shock which would otherwise be imposed on the vehicle body.

2 Claims, 7 Drawing Figures

4,662,249

SHIFT VALVE WITH AN INTERMEDIATE POSITION DURING A 4-2 SHIFT

This is a continuation of application Ser. No. 354,928, filed Mar. 5, 1982, now abandoned.

BACKGROUND OF THE INVENTION

(1) Field of the Art

This invention relates to a hydraulic control system for electrically controlled automatic transmissions of motor vehicles, and more particularly to a hydraulic control system which is provided with means for precluding the shock of deceleration as caused upon a manual shift from a high-speed to low-speed gear position.

(2) Description of the Prior Art

In an automatic transmission having a D-(drive) range providing a gear position higher than the 3rd speed and a 2nd range or L-(low) range providing 2nd or 1st speed position in which engine brake is applied, the vehicle is subjected to a large shock of deceleration upon a shift jumping over an intermediate speed, for example, on a direct shift to the 2nd speed for deceleration during operation at the 4th speed of D-range. In order to lessen such a deceleration shock, there have been proposed various methods, including a method for transitionally establishing the intermediate 3rd speed on the occasion of a down-shift to a lower speed position.

SUMMARY OF THE INVENTION

It is an object of the present invention to provide a hydraulic control system for an automatic transmission of a motor vehicle, which is provided with a simple mechanism for temporarily establishing an intermediate gear position at the time of a manual shift jumping over the intermediate speed as mentioned above.

According to an important aspect of the present invention, a hydraulic control system which achieves the above-mentioned object comprises: a pressure source; a pressure regulator valve for regulating a pressurized fluid from said pressure source into a controlled line pressure; a manual valve for distributing the line pressure to predetermined hydraulic conduits according to the gear position of the transmission; a solenoid valve controlled by an electric control circuit and located in a predetermined position of the hydraulic control system for producing an output responsive to operating conditions of the vehicle such as vehicle speed and throttle opening; and a plural number of shift valves supplied with the line pressure through the manual valve and with the solenoid pressure controlled by the solenoid valve for selectively engaging and releasing friction elements of the automatic transmission; characterized in that a pressure bleeding means is provided in a fluid chamber of a particular shift valve which is supplied with the line pressure when the manual valve is shifted for a gear change thereby to bleed part of the supplied line pressure out of the pressure chamber to limit the pressure increase in that chamber and retain the gear position before the shift by holding the spool valve of the particular shift valve in an intermediate position until the solenoid pressure is turned from a high to low level.

The above and other objects, features and advantages of the invention will become apparent from the following description of a preferred embodiment and the appended claims, taken in conjunction with the accompanying drawings.

DESCRIPTION OF PREFERRED EMBODIMENT

Figure 1:
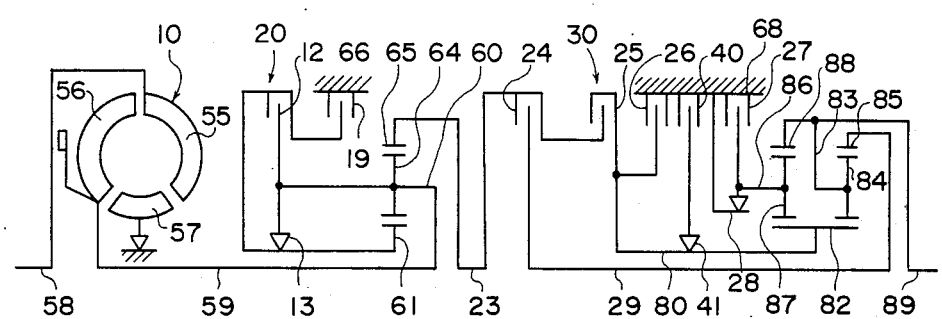
FIG. 1 is a skeletal illustration of an automatic transmission of a motor vehicle.
Figure 2:
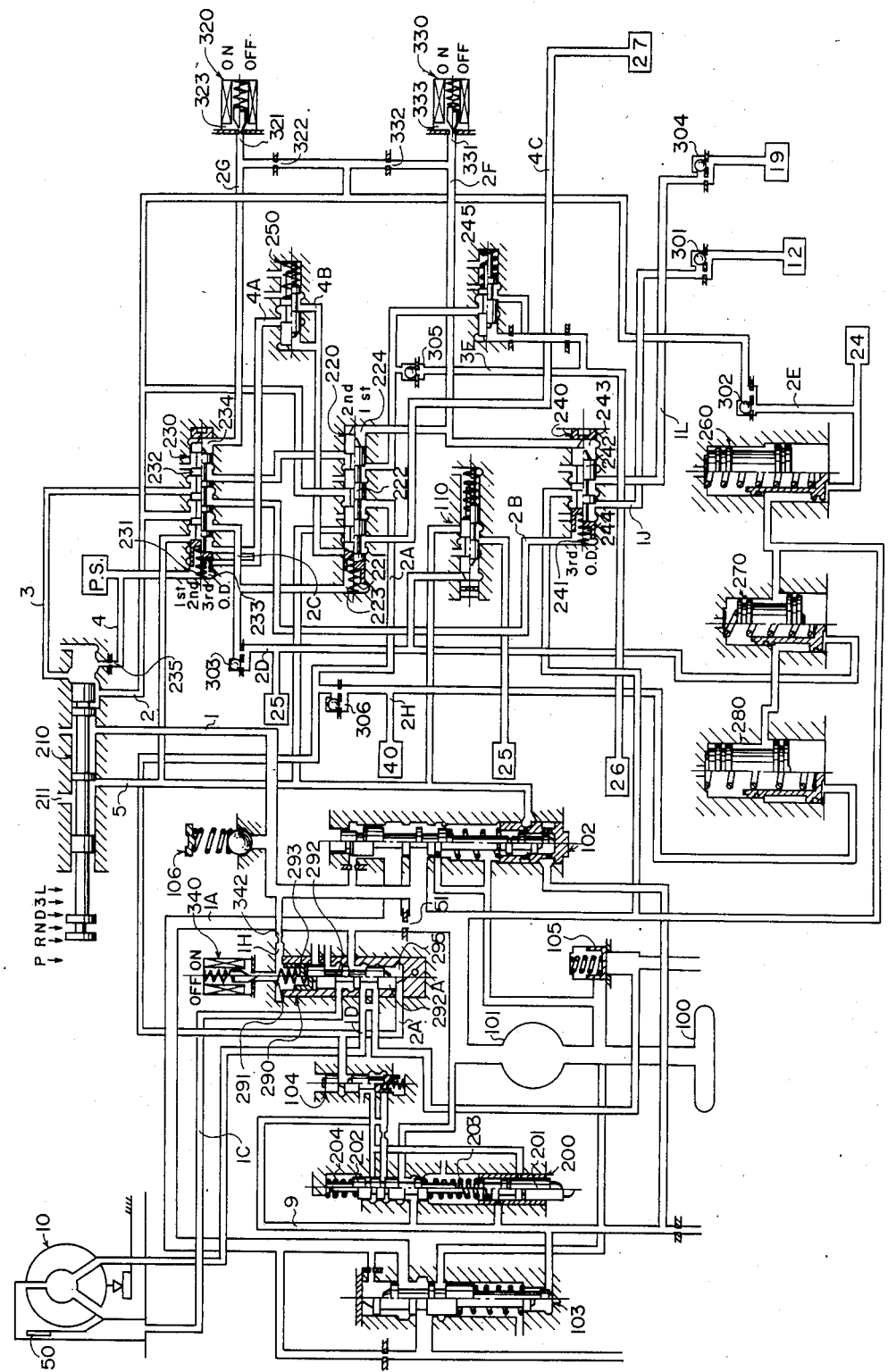
FIG. 2 is a diagram of a hydraulic control system according to the present invention.

Referring to the accompanying drawings and first to FIG. 1, there is shown in a skeletal view one example of a planetary gear unit of a fluid coupling type 4-speed automatic transmission with an over-drive mechanism. The planetary gear unit of the automatic transmission includes a torque converter 10, an overdrive mechanism 20 and a planetary gear transmission mechanism or an underdrive mechanism 30 with three forward gear positions and one reverse position, and controlled by a hydraulic control system as shown in FIG. 2. The torque converter 10 which includes a pump 55, a turbine 56 and a stator 57 in the usual manner has its pump 55 coupled with a crank shaft 58 of an engine and the turbine 56 with a turbine shaft 59. The turbine shaft 59 which constitutes the output shaft of the torque converter 10 and simultaneously the input shaft of the overdrive mechanism 20 is coupled with a carrier 60 of a planetary gear system of the overdrive mechanism 20. The carrier 60 rotatably supports thereon a planetary pinion 64 which is meshed with a sun gear 61 and a carrier 60. A multiple-disc clutch 12 and a one-way clutch 13 are provided between the sun gear 61 and carrier 60, and further a multiple-disc brake 19 is provided between the sun gear 61 and a housing or an overdrive casing which accommodates the overdrive mechanism.

The ring gear 65 of the overdrive mechanism 20 is coupled with an input shaft 23 of the planetary gear mechanism 30 with three forward and one reverse gear positions. A multiple-disc clutch 24 is provided between the input shaft 23 and an intermediate shaft 29, while a multiple-disc clutch 25 is provided between the iput shaft 23 and a sun gear shaft 30. Provided between the sun gear shaft 80 and a transmission casing 68 are multiple-disc brakes 26 and 40 and a one-way clutch 41. A sun gear 82 which is mounted on the sun gear shaft 80 constitutes two rows of juxtaposed planetary gear systems along with a carrier 83, a planetary pinion 84 supported on the carrier 83, a ring gear 85 meshed with the pinion 84, another carrier 86, a planetary pinion 87 supported on the carrier 86, and a ring gear 88 meshed with the pinion 87. The ring gear 85 is coupled with the intermediate shaft 29. The carrier 83 of one of the just-mentioned planetary gear systems is coupled with the ring gear 88 of the other planetary gear system. The carrier 83 and ring gear 88 are coupled with an output shaft 89. Provided between the carrier 86 of the other planetary gear system and the transmission casing 68 are a multiple-disc brake 27 and a one-way clutch 28.

The planetary gear unit of the above-described automatic transmission with an overdrive mechanism has its clutches and brakes engaged or released by the following hydraulic control system in response to the engine output and the vehicle speed to establish four forward speeds including overdrive (O/D) and one reverse speed.

Table L below shows the engaged and released states of the respective clutches and brakes in relation with the gear positions.

TABLE I

| Shift Positions | | | Friction elements | | | | | | | | |
|---|---|---|---|---|---|---|---|---|---|---|---|
| | | | Clutch 12 | Clutch 24 | Clutch 25 | Brake 19 | Brake 26 | Brake 27 | Brake 40 | One-way Clutch 13 | One-way Clutch 28 | One-way Clutch 41 |
| Parking (P) | | | O | X | X | X | X | X | X | — | — | — |
| Reverse (R) | | | O | X | X | O | X | X | X | Lock | Lock | — |
| Neutral (N) | | | O | X | X | X | X | X | X | — | — | — |
| Forward Speeds | D-Range | 1st | O | O | X | X | X | X | X | — | — | O'rrun |
| | | 2nd | O | O | X | X | X | X | O | Lock | O'rrun | O'rrun |
| | | 3rd | O | O | O | X | X | X | O | Lock | O'rrun | O'rrun |
| | | O.D. | X | O | O | O | X | X | O | O'rrun | O'rrun | O'rrun |
| | 3-range | 1st | O | O | X | X | X | X | X | Lock | Lock | O'rrun |
| | | 2nd | O | O | X | X | O | X | O | Lock | O'rrun | Lock |
| | | 3rd | O | O | O | X | X | X | O | Lock | O'rrun | O'rrun |
| | L-range | 1st | O | O | X | X | X | O | X | Lock | Lock | O'rrun |
| | | 2nd | O | O | X | X | O | X | O | Lock | O'rrun | Lock |

In Table 1, the engaged and released states of the clutches and brakes are indicated by marks "O" and "X", respectively.

The hydraulic control system according to the present invention, which permits automatic or manual gear shifts by selectively operating the above-described clutches and brakes 12, 19, 24 to 27, and 40, is hereafter described by way of a preferred embodiment shown in FIG. 2.

The hydraulic control system includes: an oil reservoir 100; an oil pump 101, a pressure regulator valve 102; a second pressure regulator valve 103; a cut-back valve 104; a cooler by-pass valve 105; a pressure release valve 106; a reverse clutch sequence valve 110; a direct-coupling clutch (lock-up) control valve 290; a throttle valve 200; a manual valve 210; a 1-2 shift valve 220; a 2-3 shift valve 230; a 3-4 shift valve 240; an intermediate coast shift modulator valve 245 for regulating the fluid pressure to be supplied to the brake 26; a low coast shift modulator valve 250 for regulating the fluid pressure to be supplied to the brake 27; an accumulator 260 for ensuring smooth coupling of the clutch 24; an accumulator 270 for ensuring smooth engagement of the brake 40; check valves 301 to 306 for controlling flow rates of fluid to be supplied to the clutches 12, 24 and 25 and brakes 19, 26 and 40, respectively; a first solenoid valve 320 opened and closed by an electronic circuit (computer) which will be described hereinlater, for controlling both the 1-3 and 3-4 shift valves; a third solenoid valve 340 for controlling the afore-mentioned direct-coupling clutch control valve 120; conduits intercommunicating the respective valves and the hydraulic cylinders of the clutches and brakes.

The working fluid which is taken up from the reservoir 100 by the oil pump 101 is regulated into a line pressure of a predetermined level by the pressure regulator valve 102 for supply to a conduit 1. The pressurized fluid which is supplied to the second pressure regulator valve 103 via conduit 1A, which is in communication with the conduit 1 through the first pressure regulator valve 102 and orifice 51, is regulated into predetermined torque converter pressure, lubricant oil pressure and cooler pressure according to the throttle pressure produced by the throttle valve 200. The manual valve 210 which is in communication with the conduit 1 is connected to a shift lever at the side of the driver's seat so that it is manually shiftable to and from P (parking), R (reverse), N (neutral), D (drive), 3 (third) and L (low) positions according to the range selected by the shift lever. Table II below shows the ON and OFF states of the conduits 2 to 5 which are communicable with the conduit 1, wherein a circle "O" indicates ON-state with the supply of the line pressure while a cross "X" denotes OFF-state or drained state.

TABLE II

| | P | R | N | D | 3 | L |
|---|---|---|---|---|---|---|
| Conduit 2 | X | X | X | O | O | O |
| Conduit 3 | X | X | X | X | O | O |
| Conduit 4 | X | X | X | X | X | O |
| Conduit 5 | X | O | X | X | X | X |

The first solenoid valve 320 which controls the 2-3 shift valve 230 closes its valve port 321 in de-energized state to generate a solenoid pressure of a high level (equal to the line pressure) in a conduit 2G which is in communication with the conduit 2 through an orifice 322. In energized state, it opens its valve port 321 to drain the fluid pressure in the conduit 2G through a drain port 323, generating a solenoid pressure of a low level in the conduit 2G. The second solenoid valve 330 which controls the 1-2 shift valve 220 and B 3-4 shift valve 240 closes its valve port 331 in de-energized state to build up a solenoid pressure of a high level in the conduit 2F which is in communication with the conduit 2 through an orifice 332, and in energized stage it opens the valve port 331 to generate a solenoid pressure of a low level in the conduit 2F by draining the fluid pressure in the conduit 2F through a drain port 333. Table III below shows the energized and de-energized states of the solenoid valves 320 and 330 as controlled by the electronic circuit which will be described hereinlater, in relation with the gear positions of the automatic transmission.

TABLE III

| | P | R | N | D | | | | 3 | | | L | |
|---|---|---|---|---|---|---|---|---|---|---|---|---|
| | | | | 4 | 3 | 2 | 1 | 3 | 2 | 1 | 2 | 1 |
| 320 | X | X | X | X | X | O | O | X | O | O | O | O |

TABLE III-continued

| | P | R | N | D | | | | 3 | | | L | |
|---|---|---|---|---|---|---|---|---|---|---|---|---|
| | | | | 4 | 3 | 2 | 1 | 3 | 2 | 1 | 2 | 1 |
| 330 | X | X | X | X | O | O | X | O | O | X | O | X |

The third solenoid valve 340 which controls the lock-up control valve 290 is provided in the fluid chamber 121 at the upper end, as viewed in the drawing, of the lock-up valve 120, which is in communication with a conduit 1H which in turn communicates with the conduit 1 through an orifice 342. The solenoid valve 340, when in de-energized state, produces a solenoid pressure of a high level in the fluid chamber 121 to push a spool 122 downward as viewed in the drawing, along with a back-loaded spring 123, holding the spool 122 in a lower position shown, and, in energized state, drains the fluid chamber 121 to turn the solenoid pressure to a low level.

The 1-2 shift valve 220 is provided with a spool 222 which is loaded with a spring 221 on its left side as viewed in the drawing. It receives a high level solenoid pressure in a fluid chamber 224 at its right end when the solenoid valve 330 is in de-energized state with a high level solenoid pressure prevailing in the conduit 2F. By application of a high level solenoid pressure, the spool 222 is held in a left-hand 1st speed position as indicated by a lower half of the spool in FIG. 2. If the solenoid valve 330 is energized and the conduit 2F is drained to turn the solenoid pressure to the low level, the spool 222 is held in a right hand 2nd speed position as indicated by an upper half of the spool in the same figure. In the 3rd and 4th speed positions, the line pressure is admitted into the left-hand fluid chamber 223 through the manual valve 210 and 2-3 shift valve 230 and via conduit 2C, fixing the spool 222 in the right-hand position irrespective of the level of the solenoid pressure.

Figure 3:
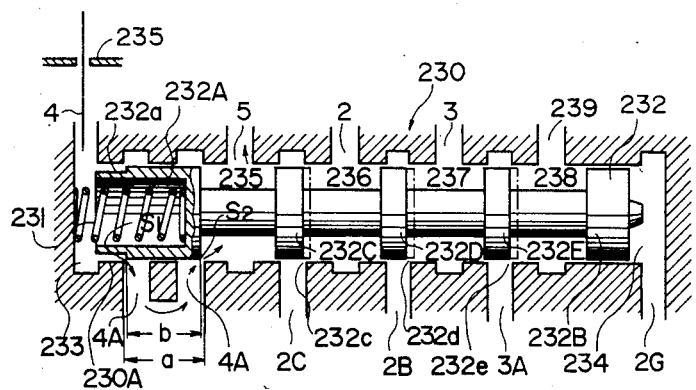
FIG. 3 is an enlarged diagrammatic view of a 2-3 shift valve.

The 2-3 shift valve 230 is provided with a spool 232 which is loaded with a spring 231 on its left side as viewed in the drawing. When the solenoid valve 320 is in energized state with the low level solenoid pressure prevailing in the conduit 2C, the spool 232 is held in a right-hand 1st/2nd speed position. When the solenoid valve 320 is de-energized and the high level solenoid pressure in the conduit 2G is applied to the fluid chamber 234, the spool 232 is held in a left-hand 3rd/4th speed position by the high solenoid pressure. If the line pressure is supplied to the conduit 4, it is admitted into a left-hand fluid chamber 233 via orifice 235, locking the spool 232 in the right-hand 1st/2nd speed position. As shown particularly in FIG. 3, the spool 232 is provided at its fore end (the left end as viewed in the same figure) with a smaller diameter portion 232a of a hollow cylindrical form which receives a spring 231 in its inner cavity, and with a left-end land 232A to be subjected to the line pressure admitted into the fluid chamber 233 and a right-end land 232B to be subjected to the solenoid pressure supplied to the conduit 2G. Between the lands 232A and 232B, the spool 232 is further provided with lands 232C, 232D and 232E, defining fluid chambers 235 to 238 which communicate with conduits 5, 2, 3 and drain port 239, respectively. The width b of the left-end land 232A except the fore end 232a is formed smaller by a predetermined dimension than the width of the port in communication with the conduit 4A, which is bisected in the particular embodiment shown. Therefore, as the spool 232 which is held in the left-hand position by the high level solenoid pressure Ps prevailing in the fluid chamber 234 is pushed to the right as viewed in the drawing by the line pressure PL supplied to the conduit 4 and the force F of the spring 231, the line pressure from the conduit 4 is permitted to leak into the conduit 4A through a gap S1 between the valve casing wall and the fore end portion 232a of the land 232A and at the same time into the fluid chamber 235 through a gap S2 between the inner edges of the land 232A and conduit 4A, as soon as the spool 232 reaches the position shown in FIG. 3, draining the leaked fluid through a drain port 211 of the manual valve 210 through the conduit 5 and manual valve 210. Consequently, the pressure in the fluid chamber 233 is dropped by a predetermined value to assume a preset lower level P1. This pressure drop is attained even if the amount of the fluid which is leaked and drained through the gaps S1 and S2 is small since the supply of the pressurized fluid from the conduit 4 to the fluid chamber 233 is restricted by the orifice 235 which is provided in the conduit 4. The lowered level P1 of the fluid chamber 233 is so determined to satisfy $P1+F=Ps$ that the spool 232 is temporarily stopped in the intermediate position for a predetermined time period. While the spool 232 is stopped in that position, the conduits 2C, 2B and 3A are either communicated with the conduits 2, 3 and drain port 239 through the small gaps 232c to 232e, respectively, or closed by the lands 232C to 232D as shown in phantom in FIG. 3 to retain the 3rd/4th speed position. The spool 232 is held in the intermediate position until the solenoid valve 320 is energized to turn the solenoid pressure in the fluid chamber 235 to the low level or until the solenoid pressure becomes $P1+F$ Ps upon lapse of a time which is preset in the program of the control computer. As soon as the spool 232 is displaced to the right from the intermediate position as viewed in the drawing, the communication between the conduits 4A and 5 is blocked and the line pressure PL prevails in the fluid chamber 233, so that the spool 232 is locked in the right-hand 1st/2nd speed position no matter whether the solenoid pressure in the fluid chamber 234 is at the high or low level.

The 3-4 shift valve 240 is provided with a spool which is loaded with a spring 241 on one side thereof. In the 1st speed position with the solenoid valve 330 in de-energized state, the high level solenoid pressure is admitted into a right-hand fluid chamber 243 through the conduit 2F, fixing the spool 242 in the left-hand 4th speed (overdrive) position. Upon energizing the solenoid 330 to drain the conduit 2F and turn the solenoid pressure to the low level, the spool 242 is displaced to a right-hand 3rd speed position as viewed in the drawing by the action of the spring 241. When the line pressure is supplied to the left-hand fluid chamber 244 through the manual valve 210, conduit 2, 2-3 shift valve 230 and conduit 2B, the spool 242 is locked in the right-hand (3rd speed) position by the efforts of the line pressure and the spring 241.

The throttle valve 200 which receives the line pressure from the conduit 1 produces in conduit 9 a throttle pressure commensurate with the throttle opening, by stroking a throttle plunger 201 according to the amount of depression of the accelerator pedal and thereby displacing a spool 202 which is back-loaded with a spring 204, through a spring 203 interposed between the throttle plunger 201 and the spool 202.

When the manual valve 210 is in the N-range position, the conduit 1 is not in communication with any one of the conduits 2 to 5 as shown in Table II, and the first and second solenoid valves 320 and 330 are held in de-energized state as shown in Table III. Therefore, the spools of the 1-2 shift valve 220, 2-3 shift valve 230 and 3-4 shift valve 240 are all held in the right-hand positions as viewed in the drawing by the actions of the respective biasing springs. It follows that the clutch 12 alone is engaged since it is supplied with the line pressure directly from the conduit 1 via 3-4 shift valve 240 and conduit 1J, by-passing the manual valve 210.

If the manual valve 210 is shifted to the D-range position, the line pressure is supplied to the conduit 2 as shown in Table II and as a result it is supplied through the check valve 302 and conduit 2E to engage the clutch 24. In the 1st speed, the solenoid valve 320 is energized while the solenoid valve 330 is held in de-energized state as shown in Table III, so that the spool 222 of the 1-2 shift valve 220 is held in the left-hand position, draining the conduits 3E and 2A which communicate with the brakes 26 and 40 and blocking the supply of fluid pressure to the conduit 4C which communicates with the brake 27. Consequently, the brakes 26, 40 and 27 are in released state. If the vehicle speed reaches a predetermined value, the solenoid valve 330 is energized in response to an output signal of the computer and the solenoid pressure prevailing in the fluid chamber 224 is turned to the low level. Therefore, the spool 222 of the 1-2 shift valve 220 is displaced to the left as viewed in the drawing, supplying the fluid pressure through the 1-2 shift valve 220, conduit 2A, check valve 306 and conduit 2H to engage the brake 40 for an upshift to the 2nd speed. At the time of an upshift to the 3rd speed, the solenoid valve 320 is de-energized by an output signal of the computer as soon as the vehicle speed and the throttle opening reach predetermined values, displacing the spool 232 of the 2-3 shift valve 230 to the left, supplying the fluid pressure through the conduit 2C, check valve 303 and conduits 2C and 2D to engage the clutch 25. Simultaneously, the spool 222 of the 1-2 shift valve 220 is displaced to and locked in the left-hand position (the 2nd speed position ) by the line pressure admitted into the fluid chamber 223 from the conduit 2C. Similarly, an upshift to the 4th speed is effected when the solenoid valve 330 is de-energized in response to an output signal of the computer, whereupon the solenoid pressure admitted into the right fluid chamber 243 from the conduit 2F is turned to the low level and the spool 242 of the 3-4 shift valve 240 is displaced to the right as viewed in the drawing. Consequently, the conduit 1J is drained and the fluid pressure is supplied to the conduit 1L to release the clutch 12 and engage the brake 19.

When the manual valve 210 is in the 3-range position, the line pressure is supplied to the conduit 3 in addition to the conduit 2 as shown in Table II. The shifts between the 1st, 2nd and 3rd speeds are effected in the same manner as in the above-described D-range but no upshift to the 4th speed takes place as the spool 242 of the 3-4 shift valve 240 is fixed in the left-hand position by the line pressure which is admitted into the left-end fluid chamber 244 through the conduits 3 and 2B. If the manual valve 210 is manually changed for a D-3 shift during operation in the 4th speed of D-range, the gears are immediately downshifted to the 3rd speed by admitting the line pressure in the left-end chamber 244 in the manner as described hereinbefore.

When the manual valve 210 is in the L-range position, the line pressure is supplied to the conduit 4 in addition to the conduits 2 and 3. In this instance, the 1st speed is established in the same manner as in the D-range position. In the 2nd speed position, the fluid pressure is supplied through the conduit 4, 2-3 shift valve 230, conduit 4A, low coast modulator valve 250, conduit 4B, 1-2 shift valve 220 and conduit 4C to engage the brake 27, permitting to produce the effect of engine brake. Further, if the shift lever is changed into 2-range during operation in 3rd position, the solenoid valve 320 is energized by an output signal of the computer to effect the 3-2 downshift at a time point when the vehicle is decelerated to a predetermined speed.

When the manual valve 210 is shifted to the D-, 3- and L-range positions to produce the line pressure in the conduit 2 with the 1-2 shift valve 220 held in the 2nd speed position (right-hand position as viewed in the drawing), the line pressure which prevails in the conduit 2A is supplied to a fluid chamber 295 at the lower end of the lock-up control valve 290. By this line pressure, the spool 292 of the lock-up control valve 290 is moved upward in the drawing to communicate the conduit 1A with the conduit 1D if the third solenoid valve 340 is in energized state to produce a low level fluid pressure in an upper fluid chamber 294 of the lock-up control valve 290. As a result, the clutch 50 which is provided in the torque converter 10 is engaged to put same in the state of direct coupling. In a case where no line pressure is produced in the conduit 2A or in a case where the solenoid valve 340 is de-energized to produce a high level solenoid pressure in the fluid chamber 294 although the line pressure prevails in the conduit 2A, the spool 292 is held in the lower position as viewed in the drawing by the efforts of the spring 291 or 291 and the solenoid pressure. While the spool 292 is in the lower position, the conduit 1A is communicated with the conduit 1C with the direct coupling clutch of the torque converter in released state. The energization of the solenoid valve 340 is effected under the control of the computer when the vehicle speed and the degree of throttle opening exceed predetermined values.

Figure 6:
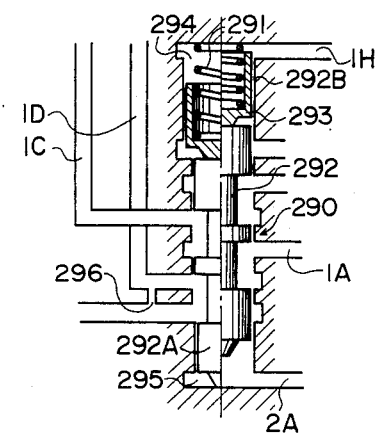
FIG. 6 is an enlarged diagrammatic view of a lock-up control valve.

As shown in FIG. 6, the lock-up control valve 290 is provided with a spool 292 loaded with a biasing spring 291 and another spool 293 disposed in series with the spool 292. The line pressure in the conduit 1 is introduced via orifice 342 and conduit 1H into the fluid chamber 294 at the upper end of the valve as viewed in the drawing. The fluid chamber 295 at the other end of the valve (at the lower end in the drawing) receives the line pressure in the 2nd, 3rd and 4th speeds through the 1-2 shift valve 220 and conduit 2A. Therefore, the lock-up valve 290 can be controlled by the solenoid valve 340 in the 2nd, 3rd and 4th speeds but not in other operating conditions. This arrangement is intended to prevent engine stalls or other operation failures due to malfunctioning of the lock-up clutch when starting a vehicle.

The above-mentioned spools 292 and 293 and spring 291 are designed as follows.

Figure 7:
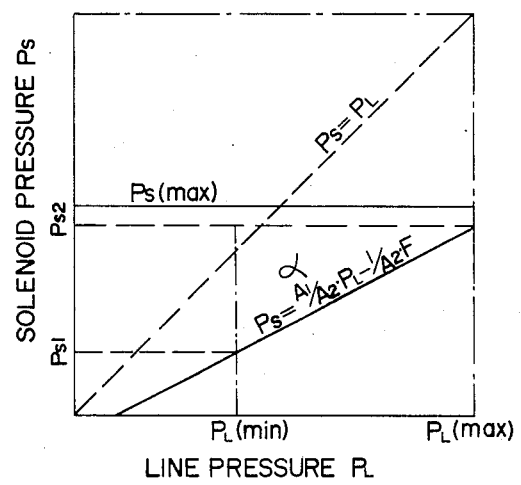
FIG. 7 is a graphic representation of an optimum range of various operational factors of the lock-up control valve.

If the pressure receiving area of the spool 292 in the fluid chamber 295 is expressed by $A_1$, the pressure receiving area of the spool 293 in the fluid chamber 294 by $A_2$, the force of the spring 291 by F, the line pressure by PL and the solenoid pressure in the conduit 1H under control of the solenoid valve 340 by Ps, the line pressure PL is varied between PL(min) and PL(max) as shown in FIG. 7 by variations in the discharge pressure of the pump which is dependent on the engine r.p.m. and by operation of the pressure regulator valve 102, while the maximum retaining pressure PS(max) of the solenoid pressure Ps is determined by the construction of the solenoid valve 340.

The balance formula of the lock-up valve 290 is expressed by $$PL \cdot A_1 = Ps \cdot A_2 + F \tag{1}$$

when $PL \cdot A_1 < Ps \cdot A_2 + F$, the spool 292 is held in the lower position as viewed in the drawing with the torque converter in open state (direct-coupling released), and when $PL\ A_1 > Ps\ A_2 + F$, the spool 292 is held in the upper position to lock up the torque converter (direct coupling).

If PL=PL(max) in the balance formula (1), $$PL(\text{max}) = \frac{A_2}{A_1} Ps_2 + \frac{1}{A_1} F \tag{2}$$

and if PL=PL(min), $$PL(\text{min}) = \frac{A_2}{A_1} Ps_1 + \frac{1}{A_1} F \tag{3}$$

In order to control the spool 292 securely when PL=PL(max), it is necessary to employ a solenoid with a maximum retaining pressure of $$Ps(\text{max}) > PS \tag{4}$$

and to hold the values of $A_1$, $A_2$ *L and F in the relationship as expressed by the following formula* (5) which is obtained from formulas (2) and (4)

$$\frac{A_2}{A_1} \quad \frac{PL(\text{max}) - F/A_1}{Ps(\text{max})} \tag{5}$$

Further, in order to permit control of the spool 292 of the lock-up valve 290 when the line pressur PL is PL(min), $$Ps > O \tag{6}$$

From formulas (3) and (6), the relationship between $A_1$ and F is expressed by the following formula (7).

$$F < A_1 \cdot PL(\text{min}) \tag{7}$$

The range which satisfied the conditions of formulas (6) and (7) corresponds to the zone α of FIG. 7. According to the present invention, the pressure receiving areas $A_1$ and $A_2$ of the lock-up valve 290 and the load F of the spring are determined to satisfy these conditions.

Although in this particular embodiment the lock-up valve 290 is shown as employing a pair of spools 292 and 293 with different pressure receiving areas (different land diameters) from the standpoint of fabrication, these part may of course be integrated into a single body having lands with pressure receiving areas $A_1$ and $A_2$ as defined above.

Figure 4:
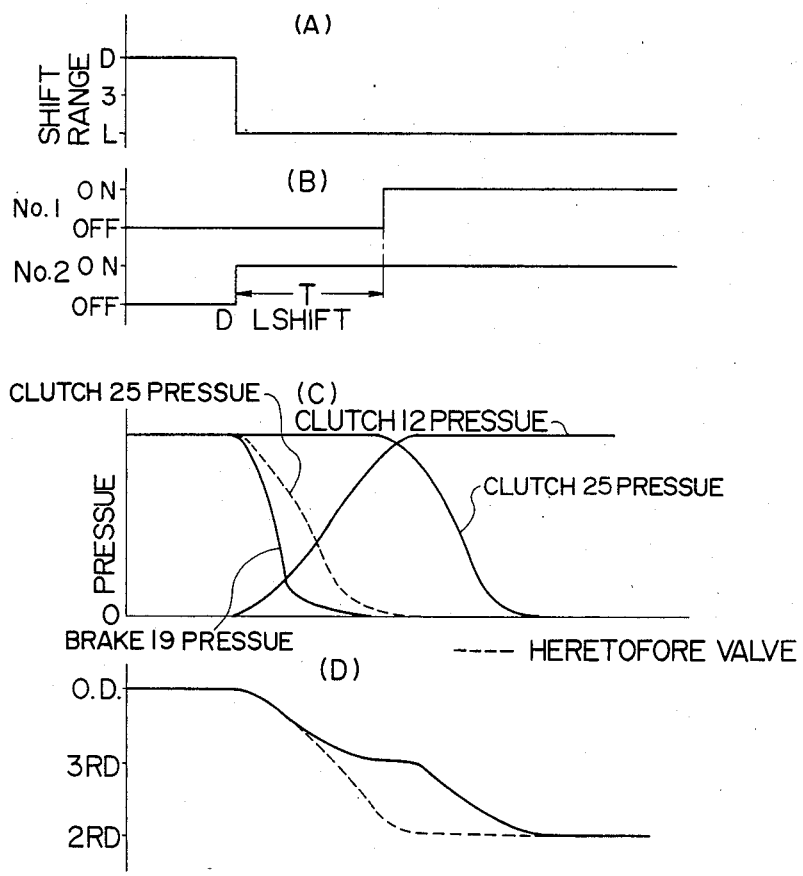
FIG. 4 is a graphic representation of operations by the 2-3 shift valve.

As shown particularly in FIG. 4(a), if the manual valve 210 is changed into the L-range position during operation in the 4th speed of D-range, the second solenoid valve 330 in OFF state (de-energized) is turned on (energized) in the first place by an output signal of the computer simultaneously with the manual D-L shift, and, after lapse of a time T which is preset in the program of the computer, the first solenoid valve 320 in OFF state is turned on, as shown in FIG. 4(b). Consequently, the line pressure which has been supplied to the conduit 2 alone is now as well supplied to the conduits 3 and 4 as shown in Table II. The line pressure supplied to the conduit 3 is admitted into the left-end fluid chamber 244 of the 3-4 shift valve 230 through the 2-3 shift valve 230 in the 3rd/4th speed position (the left-hand position as viewed in the drawing) and conduit 2B to lock the 3-4shift valve 230 in the 3rd speed position (with the spool 242 in the right-hand position as viewed in the drawing), while the line pressure supplied to the conduit 4 is admitted into the left-end fluid chamber 233 of the 2-3 shift valve 230 via orifice 235. The solenoid valve 320 is held in de-energized state for a time period T preset in the program of the computer, during which time period the spool is stopped in the afore-mentioned intermediate position to retain the 3rd speed. As soon as the solenoid valve 320 is energized by an output signal of the computer, the spool 232 is locked in the left-hand position (the 1st/2nd speed position). As a result, the fluid pressure supplied to the clutches 12 and 25 and brake 19 show the characteristics as shown in FIG. 4(c), and the downshift from the 4to 2nd speed is effected via intermediate 3rd speed as shown in FIG. 4(d). In FIGS. 4(c) and 4(d), the curves of broken line indicate the fluid pressure characteristics and shift characteristics of the conventional hydraulic control system.

Figure 5:
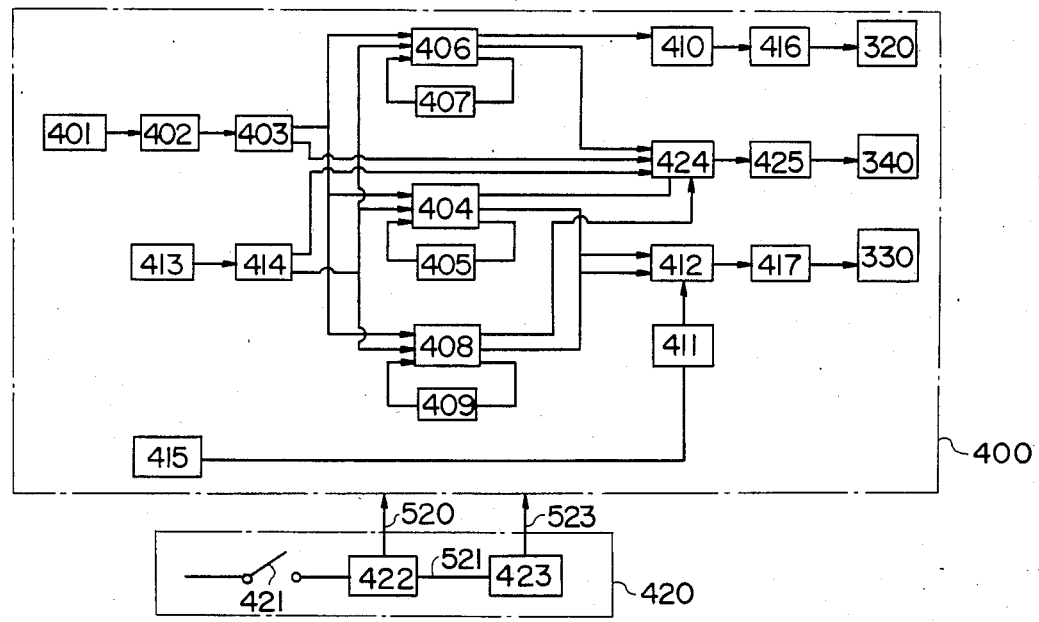
FIG. 5 is a block diagram of an electric control circuit.

Now, the electronic circuit (computer) which controls the energization and de-energization of the first and second solenoid valves 320 and 330 according to operating conditions of the vehicle is explained with reference to FIG. 5.

The electronic control includes a power circuit 420 and a computer circuit 400 connected between vehicle speed and throttle opening detectors and the solenoid valves 320 and 330. The power circuit 420 is connected to a battery through a switch 421 and to the computer circuit 400 by wire 520 through a position switch 422 which is mounted on the manual lever for setting the D-, 3- and L-ranges. The position switch 422 is connected to the computer circuit 400 by wire 523 through a power supply 423 (a constant voltage power supply) which supplies a constant voltage to the respective components of the computer 400. The computer circuit 400 includes a vehicle speed detector 401, a wave-shaping amplifier 402, a D/A (digital/analog) converter 403, a throttle position switch 413, a throttle opening voltage generator 414, a 1-2 shift discriminator 404, a 2-3 shift discriminator 406, a 3-4 shift discriminator 408, hysteresis circuits 405, 407 and 409, an ON-OFF control circuit 412 for the solenoid valve 320, an ON-OFF control circuit 412 for the solenoid valve 330, an ON-OFF control valve 424 for the solenoid valve 340, an N-D shift signal generator 415, a timer 411, amplifiers 416, 417 and 425, and solenoid valves 320, 220 and 340. The vehicle speed detector 401 indicates the vehicle speed by producing a signal of sign wave, which is shaped and amplified into a positive rectangular wave signal in the wave-shaping amplifier 402 and then converted into a DC voltage signal proportionate to the vehicle speed by the D/A converter 403. The throttle position switch 413 which detects the engine load condition is constituted by a variable resistor to produce an output signal commensurate with the throttle opening. A signal indicative of the throttle opening is formed into a DC voltage in the throttle opening voltage generator 414 and then fed to the 1-2 shift discriminator 404, 2-3 shift discriminator 406 and 3-4 shift discriminator 408. These discriminators compare the voltage signals of the vehicle speed and throttle opening, for example, by means of differential amplifiers, and, according to the resulting values, judge the conditions for 1-2, 2-3 and 3-4 shifts. The hystresis circuits 405, 407 and 409 set the conditions for 2-1, 3-2 and 4-3 downshifts, respectively, with the downshift points set at slightly lower vehicle speed levels than the upshift points in order to prevent the hunching in the shift ranges. The ON-OFF control circuit 410 for the solenoid valve 320 produces a signal of "0" (OFF) or "1" (ON) according to the output signal of the 2-3 shift discriminator thereby to open or close the solenoid valve 320 through the amplifier 416. The ON-OFF control circuit 412 for the solenoid valve 330 produces a signal of "0" or "1" according to the output signals of the 1-2 shift discriminator 404 and 3-4 shift discriminator 408 as well as the output signal of the N-D shift signal generator coming through the timer 411, thereby to open or close the solenoid valve 330 through the amplifier 417. The ON-OFF control circuit 424 for the solenoid valve 340 which is supplied with the output signals of the 1-2 shift discriminator 404, 2-3 shift discriminator 406 and 3-4shift discriminator 408 similarly opens or closes the solenoid valve 340 through the amplifier 425 when programed vehicle speed and throttle opening are reached in the respective gear positions higher than the 2nd speed.

Although there has been described and shown an embodiment which is arranged to stop the spool 232 of the 2-3 shift valve 230 temporarily in an intermediate position by providing a smaller diameter portion 232a at the outer end of the leftmost land 232A of the spool 232 and forming the land 232A in a width b which is smaller than the width a of the conduit 4A, it is also possible to provide a bleeding hole in the wall of the cylindrical land 232A at the distance of b from the right or inner end of thereof as viewed in the drawing or to form an axial slit in the left or outer end portion of the 1 and 232A. The orifice 235 which is provided in the conduit 4 for supplying the line pressure to the conduit 233 is not necessarily required but it serves to minimize the amount of fluid drain as well as the size of the bleeding means to be provided in the fluid chamber 233.

Obviously, the arrangement of the present invention which retains a spool in an intermediate position by bleeding part of the line pressure is not limited to the 2-3 shift valve and is applicable to other shift valves if desired.

As clear from the foregoing description, the hydraulic control system of the present invention is adapted to hold a spool of a shift valve of an automatic transmission in an intermediate position by bleeding the line pressure admitted into the valve thereby to temporarily retain a gear ratio before a shift when the transmission is to be shifted jumping over an intermediate gear ratio, thus maintaining the intermediate gear position for a predetermined time period. This transitional shift to the intermediate gear ratio can be attained simply by machining the spool of the shift valve, which is extremely easy and requires only a small cost in spite of the great advantages which will be brought about, i.e., the reduction of the deceleration shocks at the time of gear shift and marked simplification of the means for protecting the frictional elements of the transmission against damages due to the deceleration shocks as compared with the conventional counterparts.

We claim:

1. In a hydraulic control system for a vehicular automatic transmission which includes a speed change gear mechanism to selectively establish high speed, intermediate speed and low speed gear positions, and controlled in response to output signals of an electronic control circuit, said hydraulic control system comprising,
an oil pump (101),
a regulator valve (102) regulating line pressure from said oil pump (101),
a manual valve (210) having at least first position and second position to selectively establish said high and low speed gear position respectively,
first and second shift valves (240,230) shifted to established said speed gear positions,
a first conduit (1) connected between said regulator valve (102) and manual valve (210) and supplied with line pressure from said regulator valve (102),
a second conduit (3,2B) connected between said manual valve (210) and said first shift valve (240) and communicated with said first conduit (1) when said manual valve (210) is shifted to said second position,
a third conduit (4) connected between said manual valve (210) and said second shift valve (230) through an orifice (235) and communicated with said first conduit (1) when said manual valve (210) is shifted to said second position,
a fourth conduit (2,2G) communicating said first conduit (1) with said second shift valve (230) through an orifice (322), and
a solenoid valve (320) arranged at said fourth conduit (2,2G) to produce fluid pressure in response to said output signals of said electronic control circuit,
said first shift valve (240) having a first fluid chamber (244) communicated with said second conduit (3,2B) and supplied with said line pressure when said manual valve (210) is shifted to said second position, and
a first spool (242) arranged to move toward either one side to establish said high speed gear position or the other side to establish said intermediate and low speed gear position, and moved toward said other side by means of said line pressure acting to said first fluid chamber (244),
said second shift valve (230) having
a second fluid chamber (233) communicated with said third conduit (4),
a third fluid chamber (234) communicated with said fourth conduit (2,2G) and supplied with said fluid pressure produced by said solenoid valve (320),
a second spool (232) arranged to move toward either one side to establish said high and intermediate speed gear positions or the other side to establish said low speed gear position in response to fluid pressure acting to said second fluid chamber (233) and said fluid pressure produced by said solenoid valve (320), acting to said third fluid chamber (234), and
a bleeding means provided at said second fluid chamber (233) to leak said line pressure supplied to said second fluid chamber (233) when said second spool (232) is positioned to one side, and not to leak the line pressure supplied to said second fluid chamber (233) when said second spool (232) is positioned to the other side, whereby said first spool (242) is moved to the other side by the line pressure supplied to said first fluid chamber (244) to allow said speed change gear mechanism to shift from high speed gear position to said intermediate speed gear position, and said second spool (232) is controllable in response to said output signal from said electronic control circuit by leaking the line pressure supplied to said second fluid chamber (233) by said bleeding means to shift from intermediate speed gear position to low speed gear position in response to the output signal of said electronic control circuit when said manual valve is shifted to said second position from said first position.

2. In a hydraulic control system for a vehicular automatic transmission according to claim 1, said bleeding means including a drain port (239) to leak the oil pressure supplied to said second fluid chamber when said second spool (232) is positioned at an intermediate position between one side and the other side, whereby the fluid pressure supplied to said second fluid chamber is reduced so as not to move said second spool toward the other side against the fluid pressure produced by said solenoid valve when said manual valve (210) is shifted to said second position from said first position.

* * * * *